UNITED STATES PATENT OFFICE.

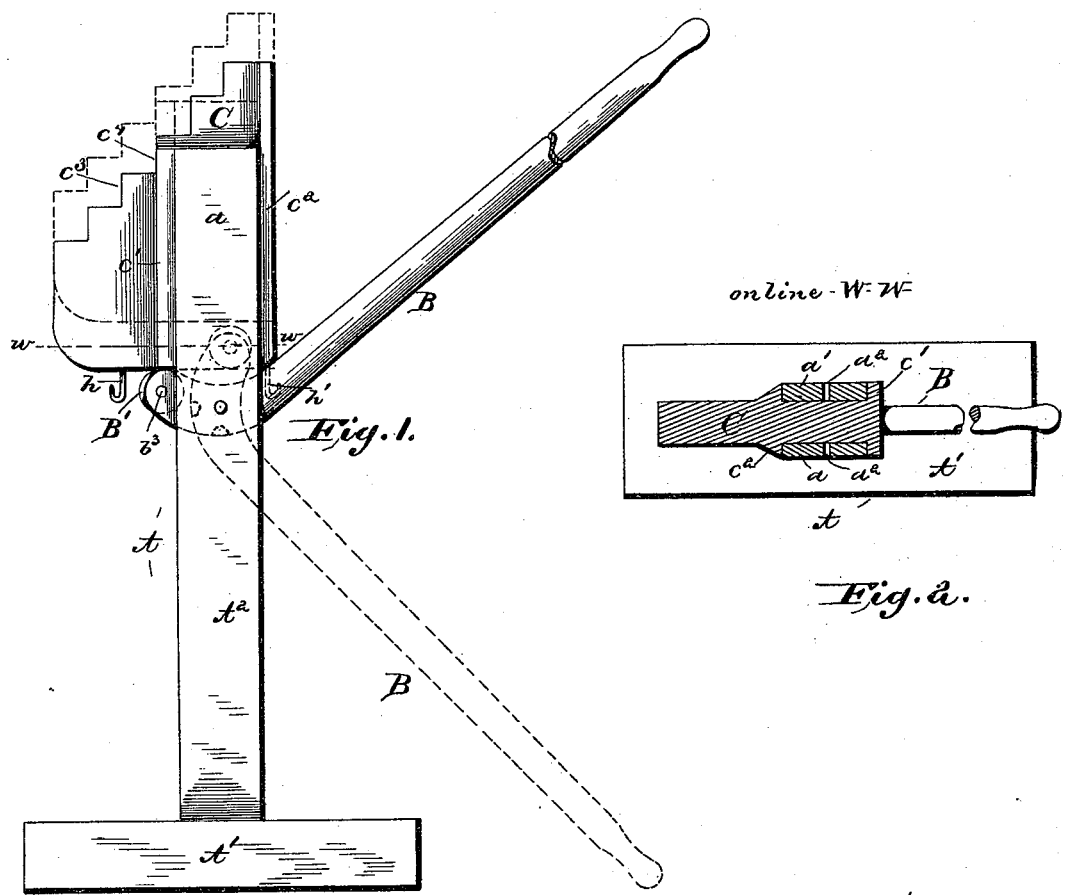

SAMUEL B. SIGLER, OF MARTINSBURG, WEST VIRGINIA.

LIFTING-JACK.

SPECIFICATION forming part of Letters Patent No. 438,496, dated October 14, 1890.

Application filed July 15, 1890. Serial No. 358,811. (No model.)

*To all whom it may concern:*

Be it known that I, SAMUEL B. SIGLER, a citizen of the United States, and a resident of Martinsburg, in the county of Berkeley, in the State of West Virginia, have invented a new and useful Lifting-Jack, of which the following is a full and accurate description.

The invention relates to a lifting-jack of the class which are commonly employed in connection with the axle-trees of wheeled vehicles, but which are adapted also to conveniently elevate and support other heavy objects as well.

The invention consists in the novel construction which will now be particularly described.

In the accompanying drawings, which constitute a part of this specification, Figure 1 represents a side elevation of a lifting-jack, showing my invention, the vertically-movable axle-tree seat or lifting-block being in its lowest adjustment. Fig. 2 is a horizontal sectional plan view as in the line $w\ w$ in Fig. 1. Fig. 3 is a detail perspective of the operating-lever as detached from its bearings.

The base $A'$ of the lifting-jack A is suitably recessed in an ordinary manner to receive the lower extremity of the vertical shaft or supporting-standard $A^2$, the upper portion of which is divided into bifurcations $a$ and $a'$ to receive the vertically-movable seat or block C and the operating-lever B.

The operating-lever B is provided with a perforation $b'$ and with a transverse bottom recess or groove $r$ for the reception of its journal or shaft $b$, which has bearings in corresponding openings $a^2\ a^2$ in the bifurcations $a$ and $a'$, and it has also an anti-friction contact-wheel $B'$, which is received in slot $b^4$, and has revolution upon its journal $b^3$, which has bearings in the walls or bifurcations $b^6\ b^7$ of the curved and slotted extremity $b^5$ of the lever. The upper portion of this end of the lever is curved or recessed, as shown, and has such relation to the slidable seat that when it is depressed, as seen in Fig. 1, it will bear equally upon the arm or handle of the lever at the rear of the seat and upon the anti-friction wheel $B'$ at the front of the same.

The seat C has vertical side recesses or ways $c'$ and $c^2$ for the reception of the bifurcations $a$ and $a'$, so that while the broad faces of such bifurcations embrace the recessed body of the slidable seat the bifurcations are themselves in turn embraced at front and rear by the projecting portions of the seat. The seat or block C has any suitable number of steps or axle-tree bearings $c^3\ c^4$, &c., and it may also have lifting-hooks, as $h$ or $h'$, for elevating such objects as could not conveniently be received upon the series of steps $c^3$, &c.

Through the provision of the anti-friction wheel $B'$ it is made practicable to elevate very considerable weights by very slight expenditure of power, the friction being reduced to the minimum and the force required continually diminishing from the inception to the completion of the movement, when, as will be seen, the wheel will be brought into the same vertical plane as the lever-shaft $b$ and the seat C will be locked against return to its depressed position.

It will be seen that by the provision of the transverse bottom recess or groove $r$ the operative relation of the block or seat C and the operating-lever are not changed; but by it the lever, the projection of which in some situations would otherwise be productive of much inconvenience, is rendered instantly withdrawable, so that it may not when not in use practically increase the space necessarily occupied by the lifter.

I am aware that an anti-friction roller has before been provided at the engaging extremity of an eccentrically-pivoted operating-lever in a lifting-jack, and that a centrally-pivoted lever has been so mounted as to be depressible into a nearly-vertical plane, so as to maintain the slidable block in its elevated position, and consequently I do not broadly claim either of such constructions. I believe, however, that I am the first to provide an anti-friction roller in a centrally-pivoted operating-lever which is depressible, so that the center of the block when elevated is seated upon the anti-friction roller, and so that it is maintained in position by the lever, and the first to provide in the operating-lever of a lifting-jack directly below the pivot-opening of the lever a bottom groove for engagement with the shaft or fulcrum pin of such lever.

It will be understood that the described lifting device may be constructed either wholly or in part of wood or metal.

The invention having been thus described, what is claimed is—

1. In a lifting-jack, an upright bifurcated standard which is provided with a transversely-extending bearing-shaft, combined with an operating-lever which is provided with a transverse perforation by which the lever may be received upon the bearing-shaft, and which is provided also with a transverse bottom groove within which the bearing-shaft may be received, and whereby the operating-lever is made insertible within the standard and detachable therefrom without removal of the shaft, substantially as described.

2. In a lifting-jack, an upright bifurcated standard which has a transverse bearing-shaft, a vertically-slidable seat or lifting-block which embraces and is embraced by the standard, and an operating-lever which has a transverse perforation by which the lever may be received upon the bearing-shaft, and which has also a transverse bottom groove within which the bearing-shaft may be received, combined, as described, so that the operating-lever may be employed in connection with the bearing-shaft either by its perforation or by its groove.

SAMUEL B. SIGLER.

Witnesses:
CHAS. H. SHOFFER,
J. M. CATROWZ.